(12) United States Patent
Arhab et al.

(10) Patent No.: US 8,123,011 B2
(45) Date of Patent: Feb. 28, 2012

(54) HYDROKINETIC COUPLING DEVICE COMPRISING FRICTION DISC CARRIED BY ROTATING LINKING ELEMENT OF TURBINE WHEEL WITH DAMPER PLATE

(75) Inventors: Rabah Arhab, St Brice Sous Foret (FR); Norberto Termenon, Paris (FR)

(73) Assignee: Valeo Embrayages, Amiens Cedex (FR)

( * ) Notice: Subject to any disclaimer, the term of this patent is extended or adjusted under 35 U.S.C. 154(b) by 709 days.

(21) Appl. No.: 12/246,840

(22) Filed: Oct. 7, 2008

(65) Prior Publication Data

US 2009/0101462 A1    Apr. 23, 2009

(30) Foreign Application Priority Data

Oct. 17, 2007 (FR) ...................... 07 58389

(51) Int. Cl.
  *F16D 33/18* (2006.01)
  *F16F 15/121* (2006.01)
(52) U.S. Cl. ...................... 192/3.29; 464/68.1
(58) Field of Classification Search ............... 192/3.29, 192/3.3, 55.61, 70.2, 85.24; 464/68.1
  See application file for complete search history.

(56) References Cited

U.S. PATENT DOCUMENTS

| | | | | |
|---|---|---|---|---|
| 6,024,197 A | * | 2/2000 | Suwa et al. | 192/70.2 |
| 6,123,178 A | * | 9/2000 | Hinkel | 192/3.29 |
| 6,296,019 B1 | | 10/2001 | Muller et al. | |
| 6,325,191 B1 | | 12/2001 | Meisner et al. | |

(Continued)

FOREIGN PATENT DOCUMENTS

DE     3543013     *    6/1987    ............... 192/3.3

(Continued)

*Primary Examiner* — Gregory Binda
*Assistant Examiner* — Josh Skroupa
(74) *Attorney, Agent, or Firm* — Berenato & White, LLC

(57) ABSTRACT

A hydrokinetic coupling device (10), which comprises an axis of rotation (B) and a torque converter (12), comprising a turbine wheel (22) mounted rotationally around a rotary driven shaft, as well as a circumferential damping device (40), comprising a damper plate (42) with a radial flange (44), rotationally linked without play to the turbine wheel (22) by a connecting element (62) and which is linked with circumferential damping with the rotary driven shaft. A locking clutch (14) that comprises at least one annular friction disc (56A, 56B) sliding axially, which rotates together with the flange (44) of the damper plate (42). The friction disc (56A, 56B) is carried by the connecting element (62), which directly connects the turbine wheel (22) to the flange (44) of the damper plate (42).

10 Claims, 2 Drawing Sheets

U.S. PATENT DOCUMENTS

| | | | |
|---|---|---|---|
| 6,832,672 B2 * | 12/2004 | Bauer et al. | 192/3.29 |
| 6,837,348 B2 * | 1/2005 | Breier et al. | 192/3.29 |
| 6,988,601 B2 * | 1/2006 | Schmid et al. | 192/3.29 |
| 7,059,459 B2 * | 6/2006 | Miyoshi | 192/70.2 |
| 2001/0007383 A1 * | 7/2001 | Schmid | 192/3.29 |
| 2006/0096832 A1 * | 5/2006 | Ito | 192/70.2 |

FOREIGN PATENT DOCUMENTS

| | | |
|---|---|---|
| DE | 4342439 * | 6/1994 |
| DE | 197 58 677 C2 | 2/2003 |
| EP | 1 469 231 | 10/2004 |
| FR | 2 765 939 | 1/1999 |

* cited by examiner

HYDROKINETIC COUPLING DEVICE COMPRISING FRICTION DISC CARRIED BY ROTATING LINKING ELEMENT OF TURBINE WHEEL WITH DAMPER PLATE

This application claims benefit under 35 U.S.C. §119 of French patent application No. 07/58389 filed Oct. 17, 2007, which is hereby incorporated by reference.

BACKGROUND OF THE INVENTION

1. Field of the Invention

The invention refers to a device for a hydrokinetic coupling, which comprises a torque converter and a locking clutch.

The invention refers more particularly to a device for a hydrokinetic coupling, in particular for a motor vehicle, which comprising an axis of rotation and which comprises:
- a shaft mounted in a rotary manner around the axis of rotation,
- a torque converter comprising a turbine wheel mounted in a rotary manner around the axis of rotation;
- a device for circumferential damping comprising a plate with a radial flange which is linked in rotation without play with the turbine wheel by a linking element on the one hand, and which is linked in rotation with the rotating shaft having circumferential damping on the other hand;
- a locking clutch which comprises at least one annular friction disc sliding axially forming a single piece with the flange of the damper plate.

2. Description of Related Art

Devices of this type are already known, for example through the document EP-A.1,469,231. This document describes a device for a hydrokinetic coupling, in which a damper plate carries friction discs on an outer radial face.

The damper plate is linked during rotation to the turbine wheel by a number of arms distributed around the axis of rotation.

In this embodiment, the connecting arms are manufactured in the same material as the guiding hub of the turbine wheel. Each arm comprises a free end, which is fitted with teeth, which are inserted in corresponding orifices of the damper plate to enable them to be connected during rotation.

However, such a device necessitates the use of numerous manufactured parts in complex shapes, which are difficult to manufacture.

SUMMARY OF THE INVENTION

To solve in particular these problems, the invention proposes a device of the type previously described, characterised in this case by the fact that the friction disc is carried by the linking element, which directly connects the turbine wheel to the flange of the damper plate.

According to other characteristics of the invention:
- the linking element is formed by an annular skirt of the damper plate, which extends axially from the outer radial end side of the flange to a free end section, which is fixed to a mount face of the turbine wheel, with the friction disc being carried by an external axial face of the said annular skirt of the damper plate;
- the friction disc comprises radial guiding teeth, which extend radially inwardly from its inner peripheral edge, and which are received in an axial sliding manner in axial channels in the outer axial face of the skirt;
- the flange and the skirt are manufactured in one piece of material
- the skirt is a separate piece which is attached to the flange of the damper plate;
- the skirt is linked to the flange during rotation by the mutual engagement of a toothed axial end side of the skirt and a toothed outer peripheral side of the flange;
- the free end section of the skirt is linked to the mounting face of the turbine wheel in a sealed manner for a fluid contained in the device;
- the free end section of the skirt is fixed to the mounting face of the turbine wheel by welding;
- the damper plate is linked during rotation to the shaft by means of at least one elastic organ with circumferential action, with this elastic organ being carried by guiding washers which are fitted axially on both sides of the flange of the damper plate and which are linked during rotation without play to the rotary shaft by means of a first central damper hub;
- the turbine wheel comprises a second turbine hub, which is mounted in a rotary manner on a piece carried by the first damper hub.

BRIEF DESCRIPTION OF THE DRAWINGS

Other characteristics and advantages will become apparent from a reading of the following detailed description in conjunction with the attached drawings, of which.

DETAILED DESCRIPTION OF PREFERRED EMBODIMENTS

In the following description, elements having identical, similar or analogous functions will be allocated the same reference numbers.

In order to make an understanding of both the description and the claims easier, use will be made—in a non-limiting manner—of an axial orientation, from the back to the front indicated by the arrow "A" in the figures and a radial orientation passing from the interior to the exterior the axis of rotation "B" of the hydrokinetic coupling device.

Figure 1:
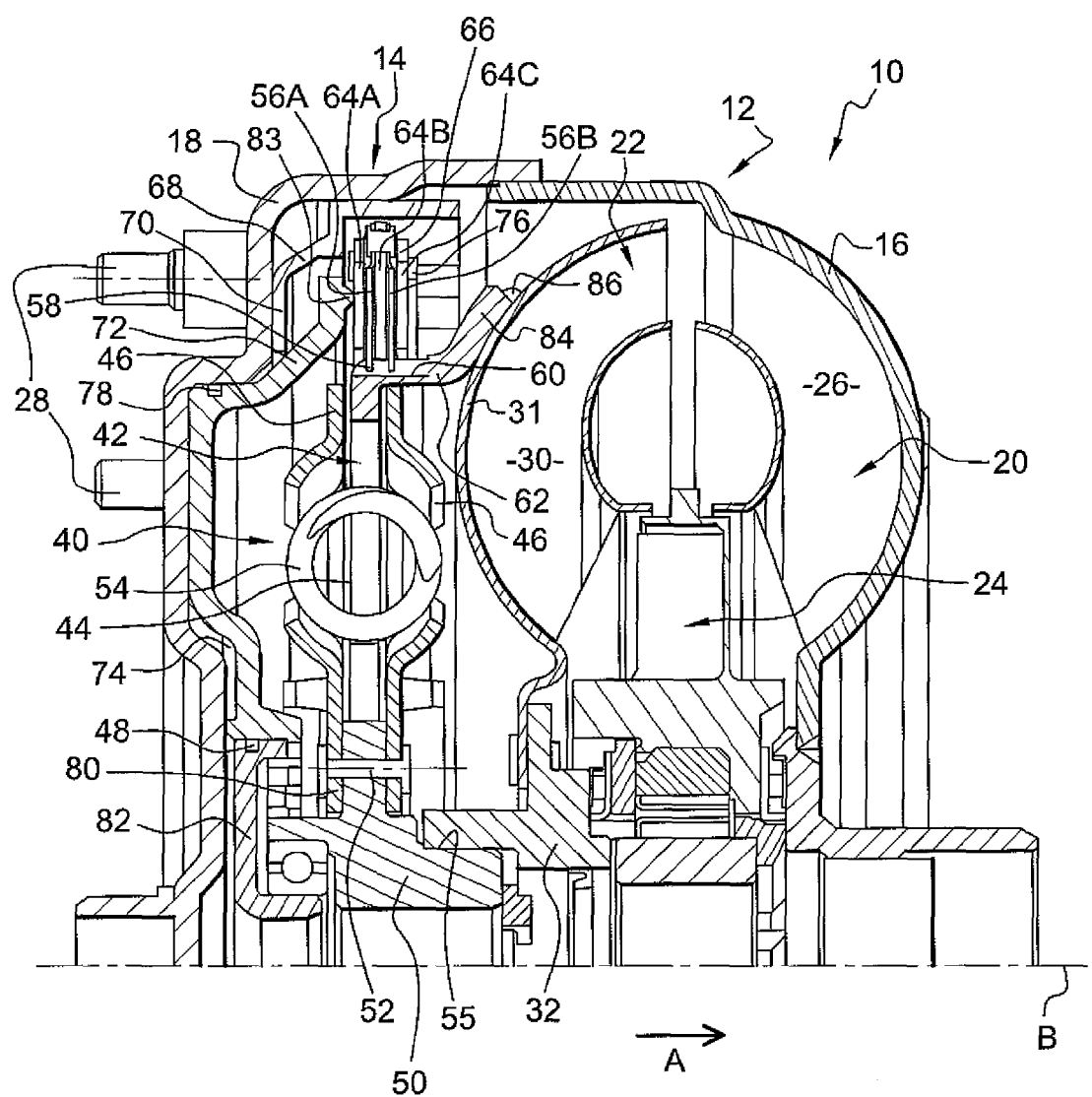
FIG. 1 is an axial section in half-view of a hydrokinetic connecting device, produced according to the instructions of the invention.

As is already known from the state of the art, a hydrokinetic coupling device 10, as illustrated in FIG. 1, comprises principally a torque converter 12 and a locking clutch 14, which are arranged in one and the same sealed casing.

In a non-limiting manner, the torque converter 12 is more particularly arranged axially in front of the locking clutch 14.

The casing is more particularly manufactured in two parts in the form of a shell, respectively a front part 16 and a rear part 18. These shells 16, 18 are leak-proof in respect of a fluid contained inside the casing which bathes the torque converter 12 and the locking clutch 14. The shells 16, 18 are typically assembled by welding and the casing is typically filled with oil.

The device 10 comprises a first feed line (not shown) with fluid for the hydraulic circuit of the torque converter 12 and a second outlet line (not shown) for the fluid.

The first front shell 16 is secured to the second rear drive shell 18. The front 16 and rear 18 shells are thus linked in a rotational manner to a first rotary drive shaft (not shown), which is co-axial with the axis "B" by means of the entry pins 28 carried by the rear shell. The pins 28 and the rear shell 18 thus form the input elements of the engine torque.

The torque converter 12 comprises a front impeller wheel 20, a rear turbine wheel 22 and a central reaction wheel 24.

The impeller wheel 20 comprises vanes 26, which are carried by the first front shell 16.

The turbine wheel 22 also comprises vanes 30, which face the vanes 26 of the impeller wheel 20. The vanes 30 are carried by a rear wall 31 of the turbine wheel, which extends outwardly and radially forming a half-torus, which envelops the vanes 30.

The rear wall 31 of the turbine wheel 22 is linked rotationally to a turbine hub 32, which is mounted in a freely rotating manner around the axle "B" in order to support the turbine wheel 22 and to guide it in rotation inside the casing.

The turbine wheel 22 is linked in a rotational manner to a second driven rotary shaft (not shown), co-axial with the axis "B" of the device 10 by means of a damper device 40 through a connecting element 62, which will be described in greater detail below.

In a motor vehicle, the drive shaft is constituted by the crankshaft of an internal combustion engine (not shown), while the driven shaft is constituted by the input shaft of a transmission system (not shown) of the vehicle, linked to the means of changing gear.

The damper device 40 is arranged axially behind the rear wall 31 of the turbine wheel. It comprises a central damper plate 42, which in turn comprises a radial flange 44 in the form of an annular disc, which is co-axial with the axis "B". The flange 44 is interposed axially between two radial guide washers 46.

These guide washers 46 are fixed by their inner peripheral edge 48 to a damper hub 50, typically by means of rivets 52. The damper hub 50 is itself linked in a rotational manner and without play to the driven shaft. The damper hub 50 thus forms an element for the output of the engine torque.

The flange 44 of the damper plate 42 is linked rotationally to the guide washers 46 with a circumferential play by means of elastic members 54 with a circumferential action, such as coil springs.

For this purpose the flange 44 and the guide washers 46 comprise windows for the housing of the elastic members 54. The guide washers 46 thus carry the elastic members 54.

The damper plate 42 thus forms an element for the input of the torque from the drive shaft and the guide washers 46 form elements of the output of the said torque after the impacts from the elastic members 54 have been damped.

In the example shown in FIG. 1, the hub of the turbine wheel 32 is mounted in a rotatable manner on a bearing surface 55, which extends axially towards the rear of the damper hub 50. This has the effect of simplifying the installation of the device 10.

In a first operating phase, known as the conversion phase, the torque of the driving shaft is transmitted to the impeller wheel 20, which causes the turbine wheel 22 to rotate in an anticlockwise direction through the effect of oil circulating between the vanes 26 and 30, as can be seen in FIG. 1.

The turbine wheel 22 rotates with an angular clearance together with the driven shaft by means of the damper plate 42. The torque is then transmitted by the damper plate 42 to the guide washers 46 forming the output element of the damper 40, via the elastic members 54 with their circumferential action 46.

During the conversion phase, the damper 40 acts to damp the vibrations or the oscillations caused in particular by the torsion produced by the acyclic running of the engine. These are not transmitted, or only slightly transmitted, since the transmission of the engine torque is only carried out by the kinetic energy of the oil in the converter 12.

The locking coupling clutch 14 of the driving and driven shafts is activated once the vehicle has been started and after the driving and driven shafts have been hydraulically coupled by the torque converter 12 in order to prevent any loss of efficiency induced in particular by slip phenomena between the turbine 22 and impeller 20 wheels.

The locking clutch 14 comprises at least one radial friction disc 56A, 56B, which is mounted co-axially with the axis of rotation "B". In the example shown in FIG. 1 the locking clutch 14 comprises two friction discs, a rear disc 56A and a front disc 56B, which are identical. One single friction disc 56A will therefore be described below The friction disc 56A is annular in shape. Each of its front and rear radial faces is covered by an annular friction lining.

The friction disc 56A rotates together with the driven shaft by means of the damper 40 and it is mounted in an axial sliding manner in relation to the first driven shaft.

For this purpose, the friction disc 56A comprises radial teeth 58, which extend radially inwardly from its inner peripheral edge. The teeth 58 are received sliding axially into axial channels 60 formed in an outer axial face of the connecting element 62, which rotates independently with the flange 44 of the damper plate 42 and which will be described in greater detail below. In other words, the friction disc 56A is non-rotatably coupled directly to the connecting element 62.

The locking clutch 14 also comprises at least two counter-discs 64A, 64B, 64C, which are co-axial with the axis of rotation "B" which are stacked axially. In the example shown in FIG. 1, the locking clutch 14 comprises a first rear end counter-disc 64A, a second central counter-disc 64B and a third front end counter-disc 64C.

The counter-discs 64A, 64B, 64C are arranged in such a manner that each friction disc 56A, 56B is interposed axially between two consecutive counter-discs 64A, 64B, 64C.

The counter-discs 64A, 64B and 64C are identical. One single counter-disc 64A will therefore be described below.

The counter-disc 64A is annular in shape with the same dimensions as the friction disc 56A. Thus the guide teeth 58 of the friction disc 56A extend inwardly and radially beyond the inner peripheral edge of the counter-disc 64A.

The counter-disc 64A rotates together with the driving shaft and it is mounted in an axial sliding manner in relation to the latter.

For this purpose the counter-disc 64A comprises radial guide teeth 66, which extend outwardly and radially from its outer peripheral edge. The guide teeth 66 thus extend radially beyond the outer peripheral edge of the friction disc 56A. The guide teeth 66 are identical in shape and dimensions and are distributed regularly around the counter-disc 64A with a given angular pitch.

The guide teeth 66 are received in an axially sliding manner in associated axial guide grooves, which are arranged in the inner annular axial face of a supporting crown 68, which rotates together with the rear shell 18 of the casing.

The crown 68 is fixed to the rear face of the rear shell 18 by means of a rear rim 70, which extends radially inwards from a rear edge of the crown 68.

The crown 68 is typically manufactured from pressed sheet metal.

The friction discs 56A, 56B are capable of being locked between the counter-discs 64A, 64B, 64C under the action of a rear piston 72, which can be axially moved in the casing between a rear disengaged position and a front engaged position.

A sealed rear chamber 74 is bordered axially to the rear by the shell 18 of the casing and to the front by the piston 72.

At its outer radial periphery, the piston 72 comprises an annular groove, in which are mounted a first means of sealing, such as a segment 78, act in conjunction with an axial surface facing the rear shell 18 and on its inner radial periphery a surface suitable for acting in conjunction with the second means of sealing, such as a segment 80, which is mounted in an annular groove of a hub 82 which surrounds the piston 72 with which it is rotationally linked by enmeshing.

The dynamic sealing means 78, 80 thus border the chamber 74, which is supplied with fluid through a hollow shaft, in this case the shaft driven by a third means of feed (not shown), which is independent of the first and second paths of the converter, thereby controlling the axial movement of the piston 72.

A front annular nose 83 of the rear piston 72 is more particularly arranged axially behind and facing the rear face of the rear end counter-disc 64A, radially inside the supporting crown 68.

In a second locking phase, the piston 72 thus enables the turbine wheel 22 to be connected to the driven shaft in a disengageable manner. For this purpose, the rear piston 73 can be moved axially between a rear disengaged position, in which the counter-discs 64A, 64B, 64C are axially separated, and a front engaged position, in which the counter-discs are pushed axially forward against an axial stop 76 of the crown 68, thereby locking the interposed friction discs 56A, 56B so as to connect the driven shaft to the driving shaft in a rotational manner.

In the engaged position, the torque of the driving shaft is transmitted by means of the locking clutch 14 to the damper 40, more precisely to the damper plate 42, and to the elastic members 54, which then damp the torsion oscillations and, after the angle of the link with play has been adjusted, the guide washers 46, which are fixed to the hub 50 linked in rotation with the driven shaft.

According to the details of the invention, the friction discs 56A, 56B are directly carried by the connecting element 62, which directly links the turbine wheel 22 to the flange 44 of the damper plate 42. The connecting element 62 is made in one single piece.

The connecting element 62 is formed by an annular skirt 62 of the damper plate 42, which extends axially forward from an outer radial edge of the flange 44 as far as a free front end section 84, which is fixed to a rear face of the rear wall 31 of the turbine wheel 22. More particularly the free front end section 84 of the skirt 62 presents a profile that is outwardly and radially flared, which follows the curved shape of the rear wall 31. Therefore, the annular skirt 62 extends axially from the radial flange 44, at one end thereof, to the turbine wheel 22 at another end of the annular skirt 62.

The annular skirt 62 of the damper plate 42 also forms the connecting element 62 which carries the friction discs 56A, 56B. Thus the outer radial face of the skirt 62 comprises the axial channels 60 in which the guide teeth 58 of the friction discs 56A, 56B are received.

Advantageously, the free front end section 84 of the skirt 62 is fixed to the mounting face of the rear wall 31 of the turbine wheel 22 in a manner that is leak-proof for the fluid contained in the device 10. Thus the fluid circulates in the optimum manner to cool the clutch 14 during the functioning of the device.

For this purpose the free front end section 84 of the skirt 62 is here fixed (i.e., non-rotatably connected) to the mounting face of the turbine wheel 22 by welding. A welding seam 86 thus runs continuously along the closed contact contour between the free front end section 84 of the skirt 62 and the rear wall 31 of the turbine wheel 22.

In the example shown in FIG. 1 the flange 44 and the skirt 62 of the damper plate 42 are formed from a single piece.

Figure 2:
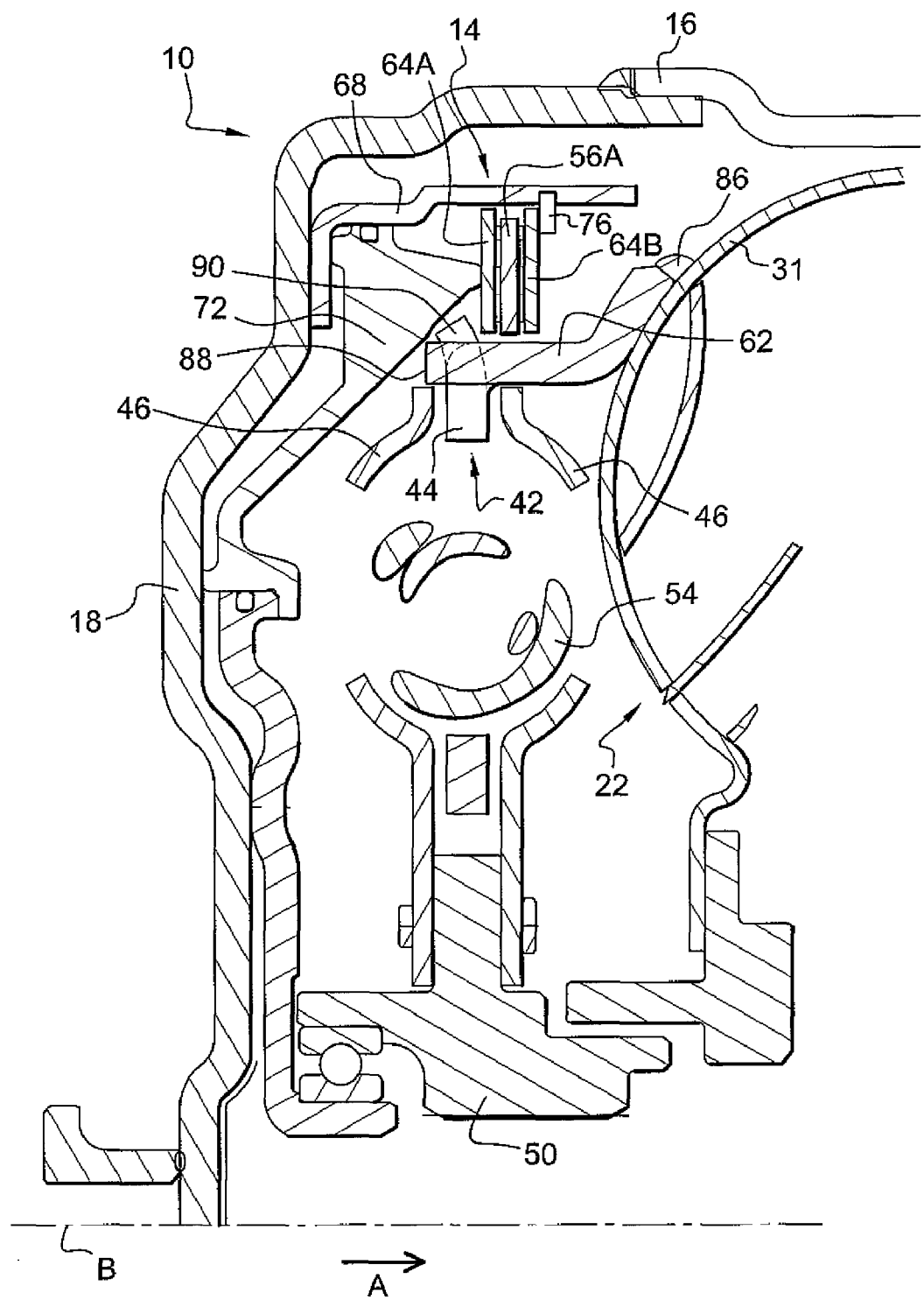
FIG. 2 is an aspect similar to that of FIG. 1, representing a second embodiment of the invention.

According to a second embodiment of the invention illustrated in FIG. 2, the skirt 62 of the damper plate 42 is a separate piece, which is attached to the flange 44 of the damper plate 42.

In this way, the skirt 62 comprises a toothed axial rear end section 88 in mesh with an outer radially toothed edge 90 of the flange 44. The skirt 62 is thus linked to the flange 44 during rotation by the mutual meshing of teeth carried by the skirt 62 and the flange 44. Therefore, the skirt 62 has the front end section 84 non-rotatably fixed to the turbine wheel 22, and the rear end section 88 non-rotatably fixed to the radial flange 44 so that the skirt 62 extends axially from the radial flange 44 at one end thereof to the turbine wheel 22 at another end of the skirt 22.

The installation of such a device 10 is very easy. In fact, it is possible to mount the skirt 62 on the rear wall 31 of the turbine wheel 22, on the one hand, and to proceed with the mounting of the flange in the damper device 40, on the other hand, independently before they are arranged in the casing 16, 18.

Then, the damper device 40 and the turbine wheel 22 are arranged in the casing 16, 18 of the device 10. During this operation, the toothed rear end section 88 of the skirt 62 is meshed in the toothed outer edge 90 of the flange 44 to form the damper plate 42 so that the turbine wheel can slide to the rear co-axially in relation to the damper device 40.

The friction discs 56A, 56B are then inserted in the channels 60 of the skirt 62.

Alternatively, the friction discs 56A, 56B may be inserted in the channels of the skirt 62 before the assembly formed by the turbine wheel 22 and the skirt 62 is arranged in the casing 16, 18.

The device 10 manufactured in accordance with the terms of the present invention is also economical, because the skirt 62 enables two functions to be carried out simultaneously.

The invention claimed is:

1. A hydrokinetic coupling device for a motor vehicle, the hydrokinetic coupling device comprising:
   an axis of rotation (B);
   a damper hub mounted to rotate around the axis of rotation (B);
   a torque converter comprising a turbine wheel mounted to rotate around the axis of rotation (B);
   a circumferential damper device comprising a damper plate with a radial flange co-axial with the axis (B) and non-rotatably fixed without any play to the turbine wheel by a connecting element on the one hand, and rotationally linked with the damper hub with circumferential play and damping on the other;
   a locking clutch comprising at least one annular, axially sliding friction disc rotatable together with the radial flange of the damper plate;
   the at least one friction disc non-rotatably coupled in an axially sliding manner directly to the connecting element directly linking the turbine wheel to the flange of the damper plate;
   the connecting element having a front end section non-rotatably fixed to the turbine wheel and a rear end section non-rotatably fixed to the radial flange so that the connecting element extending axially from the radial flange at one end thereof to the turbine wheel at another end thereof.

2. The hydrokinetic coupling device according to claim 1, wherein the connecting element is formed by an annular skirt extending axially from an outer radial edge of the flange to a mounting face of the turbine wheel so that the front free end section of the annular skirt is fixed to the mounting face of the turbine wheel; and wherein the at least one friction disc is carried by an outer axial face of the annular skirt.

3. The hydrokinetic coupling device according to claim 2, wherein the at least one friction disc comprises radial guide teeth, which extend radially inwards from their inner peripheral edge and which are received in an axial flow in associated axial channels formed in the outer axial face of the annular skirt.

4. The hydrokinetic coupling device according to claim 2, wherein the flange and the annular skirt are formed from a single piece.

5. The hydrokinetic coupling device according to claim 2, wherein the skirt is a separate piece, which is attached to the flange of the damper plate.

6. The hydrokinetic coupling device according to claim 5, wherein the annular skirt is linked rotationally to the flange by the mutual meshing of a toothed axial rear end section of the annular skirt and a toothed outer peripheral edge of the flange.

7. The hydrokinetic coupling device according to claim 2, wherein the front end section of the annular skirt is fixed to the mounting face of the turbine wheel in a leak-proof manner.

8. The hydrokinetic coupling device according to claim 7, wherein the front end section of the annular skirt is fixed to the mounting face of the turbine wheel by welding.

9. The hydrokinetic coupling device according to claim 1, wherein the damper plate is rotationally linked to the damper hub by means of at least one elastic member with circumferential action, and wherein the elastic member is carried by guide washers fitted axially on both sides of the flange of the damper plate and rotationally linked without play to the damper hub.

10. The hydrokinetic coupling device according to claim 9, wherein the turbine wheel comprises a turbine hub which is rotationally mounted on a bearing surface of the damper hub.

* * * * *